Patented Sept. 6, 1949

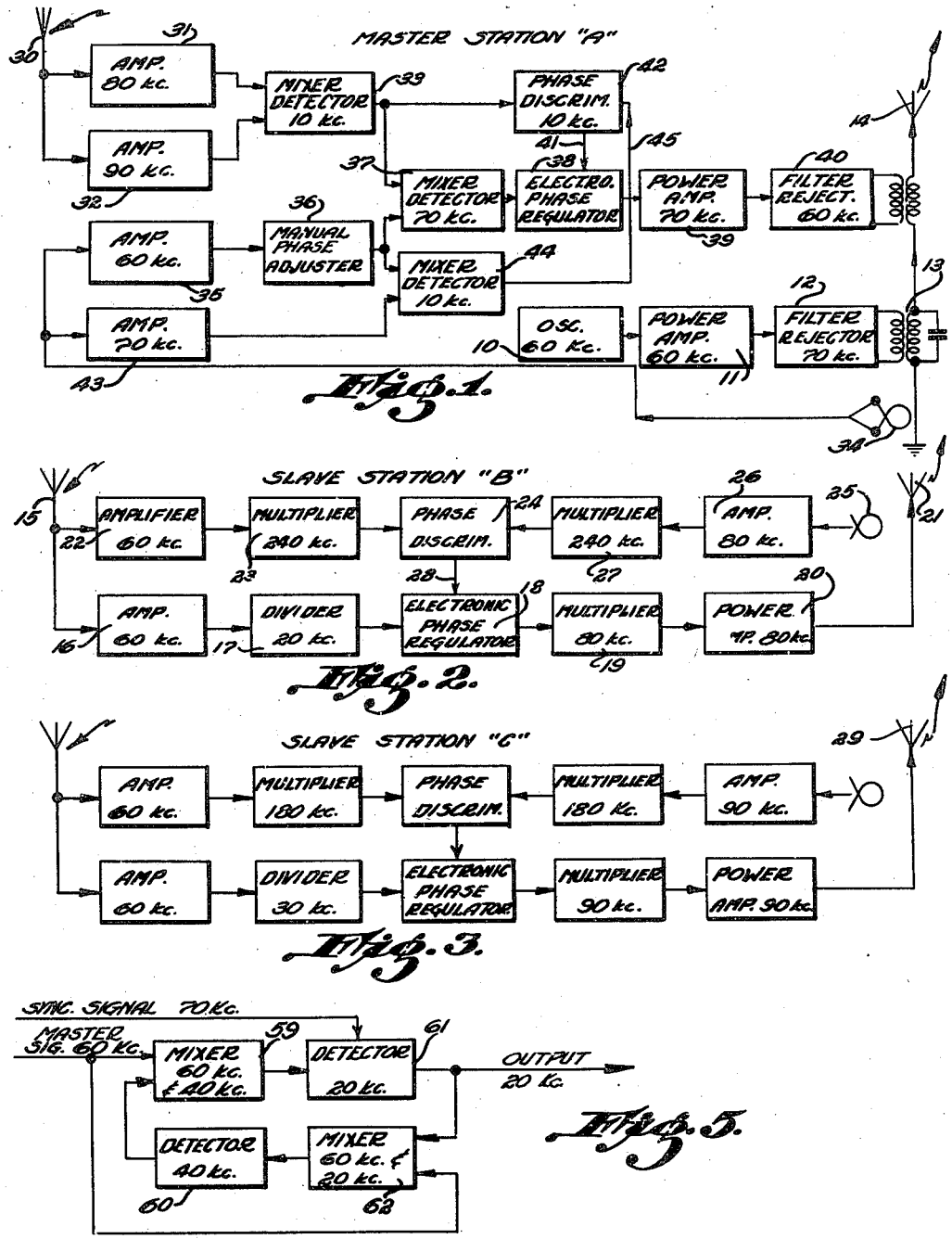

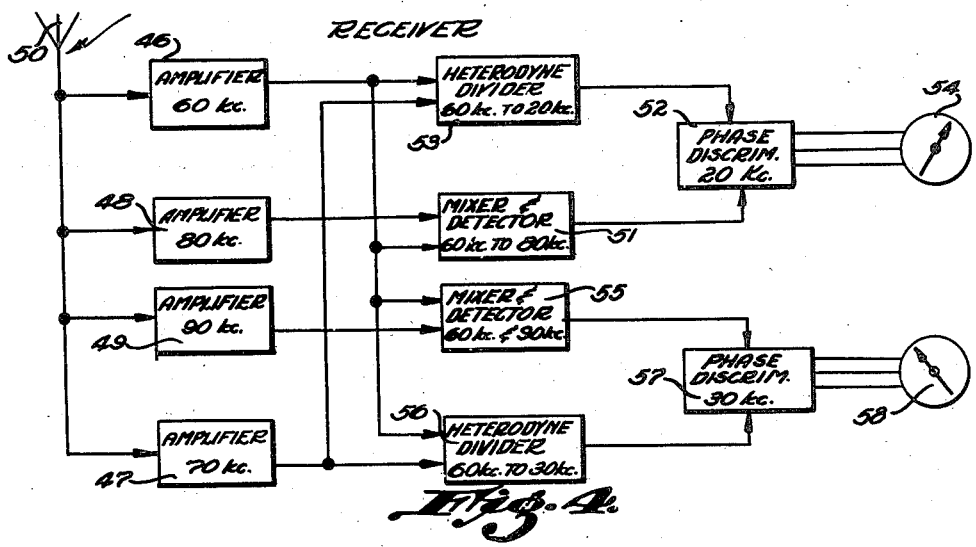

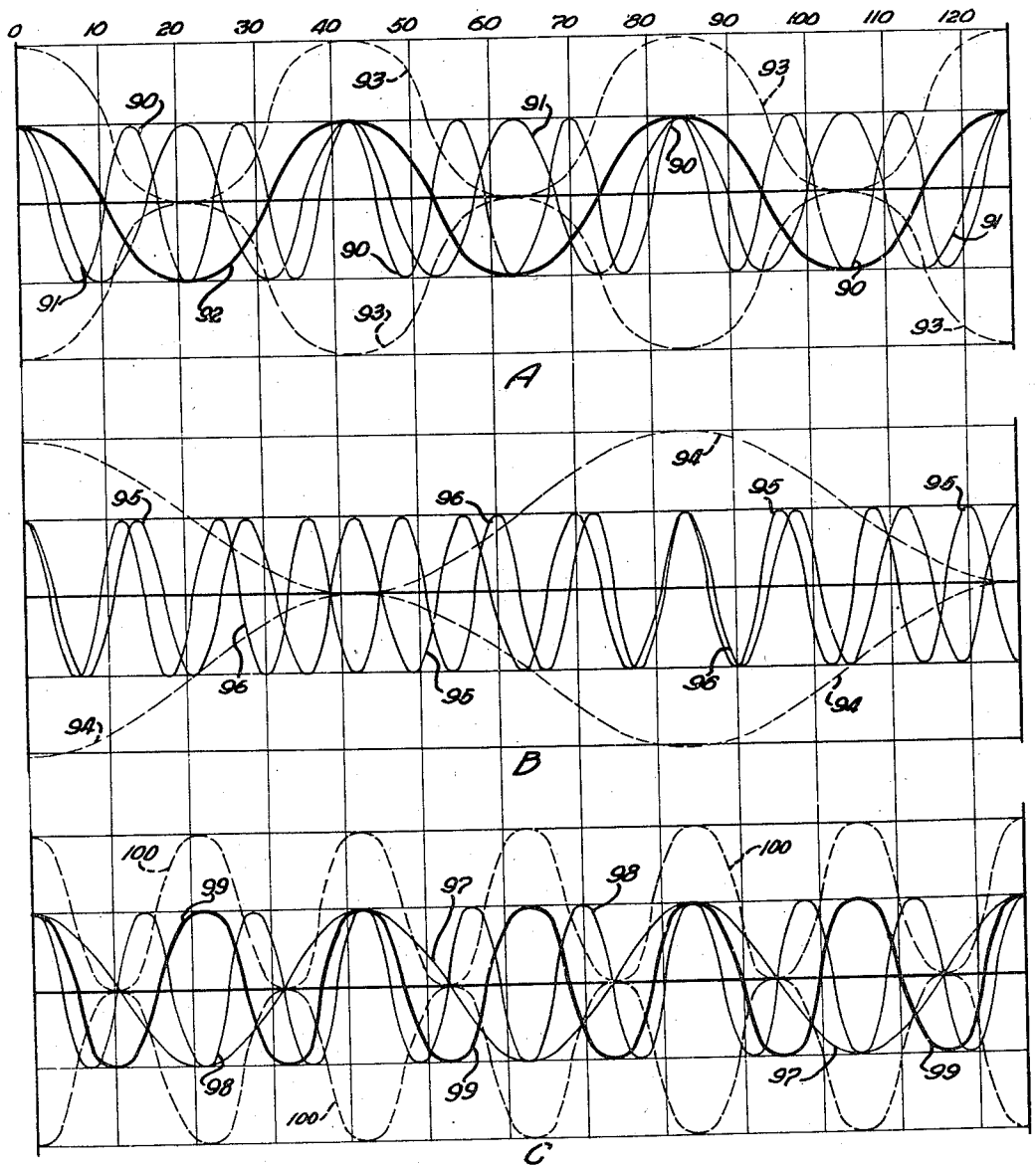

2,480,875

UNITED STATES PATENT OFFICE 2,480,875

NAVIGATION SYSTEM

William Joseph O'Brien, London, England, assignor to The Decca Record Company, Limited, London, England, a corporation of Great Britain Application March 20, 1948, Serial No. 16,125
In Great Britain March 20, 1947

9 Claims. (Cl. 343—105)

This invention relates to navigation systems, and has particular reference to a radio frequency navigation system of the continuous phase measurement type which finds particular utility when used as an aid to the navigation of both fast and slow moving vehicles.

In a copending application filed by William J. O'Brien on August 27, 1945, for "Navigation system," Serial No. 612,987, there is described a radio frequency navigational aid in which there is transmitted from a plurality of spaced points continuous signals of unlike but harmonically related frequencies bearing a fixed multiple phase relation to each other, and in which a mobile vehicle is equipped with means for separately receiving the signals and indicating their multiple phase relation at the location of the vehicle. Using three or more transmitting stations establishes two or more overlapping equiphase displacement field patterns in which the contours of constant phase relation of each pattern constitute a family of hyperbolae. The geographical position of the mobile receiver is determined by locating on a suitable chart the point at which the measured phase relation obtains, the phase indicators and the chart lines customarily being numbered indentically according to an arbitrary numbering system to facilitate plotting the position of the receiver on the chart.

Because of the precision usually required for the navigation of slow moving vehicles such as surface ships. particularly in congested waters or tortuous channels, it is desirable to produce a very sensitive indication at the receiver. With a given phase difference resolving power in the receiver, an increase in sensitivity is obtained by increasing the spacing in wave lengths at the frequency of phase comparison of the transmitting stations. With the optimum spacings used in practice, considerable ambiguity is introduced because a receiver circumnavigating the transmitters will encounter identical phase relationships at a number of different locations. With surface ships, a great deal of ambiguity does not detract from the usefulness of the system because of the relatively large amount of time available for taking observations, and because usually the geographical location is known approximately with sufficient accuracy to resolve the ambiguity. Also it is customary to provide the phase indicators with registers to count and record the total number of cycles of phase change, so that once correctly set, the indicators correctly indicate the position at any place in the field without ambiguity.

However, in the case of fast moving vehicles such as aircraft, the high sensitivity and ambiguity are definite disadvantages. The high sensitivity is normally useless, because the location of an aircraft changes so rapidly that a positional fix to an accuracy of a few yards is meaningless. For this same reason, the ambiguity problem becomes more serious. The present invention is directed to a system of the type referred to which will provide a very sensitive indication for use by slow moving vehicles, and which will provide a much less sensitive indication, with a corresponding reduction in the ambiguity, for use by fast moving vehicles.

It is therefore an object of this invention to provide a radio frequency navigation system of the continuous phase measurement type which simultaneously produces a fine sensitive field pattern and a relatively coarse, less sensitive field pattern.

It is also an object of this invention to provide a radio frequency navigation system of the character above set forth in which the same signals are used for the fine pattern as are used for the coarse pattern, and in which the choice between th fine and coarse patterns is dependent upon the character of the receiving apparatus used.

It is a still further object of this invention to provide a system of the character set forth in the preceding paragraphs in which two overlapping equi-phase displacement fields are produced by the radiation from three points of three unlike but harmonically related signals bearing a fixed multiple phase relation to each other, and in which a fourth signal of a still different frequency but harmonically related to the other frequencies and bearing fixed multiple phase relations thereto is radiated from one of the three transmitters for the purpose of controlling the operation of the receiving apparatus.

It is another object of this invention to provide a system of the character set forth in the preceding paragraph in which the multiple phase relation of the beat frequency between the two signals radiated from the one transmitter is held fixed in phase relative to the beat frequency between the other two signals.

It is also an object of this invention to provide a receiving apparatus for use with a system of the character above described in which means is provided for comparing the phase of two signals of unlike frequency by converting the frequencies to equality through division of each frequency by the unique factor of that frequency.

It is a still further object of this invention to provide a receiving apparatus of the character set forth in the preceding paragraph which includes means responsive to a synchronizing signal radiated by the transmitting means for synchronizing the operation of the frequency dividing means.

It is another object of this invention to provide in a receiver of the character set forth hereinbefore a frequency divider which produces the desired frequency by mixing with the input signal a beat frequency signal derived by mixing the input and output frequencies.

Other objects and advantages of this invention will be apparent from the following specification read in connection with the accompanying drawings, wherein:

Fig. 1 is a block diagram of the apparatus comprising the master transmitter of the system described herein;

Fig. 2 is a block diagram illustrating one of the slave transmitters;

Fig. 3 is a block diagram illustrating another of the slave transmitters.

Fig. 4 is a block diagram illustrating the apparatus comprising one form of receiver which may be used in the system;

Fig. 5 is a block diagram of a heterodyne frequency divider used in the receiver;

Fig. 6 is a block diagram of another heterodyne frequency divider;

Fig. 7 is a graph illustrating the mode of operation of the heterodyne divider; and Fig. 8 is a wiring diagram illustrating the components and electrical connections used in the heterodyne divider.

Referring to the drawings, there is illustrated in Fig. 1 the apparatus comprising the master transmitter of the system to be described. The master transmitter, sometimes hereinafter designated "station A," comprises an oscillator 10 which feeds into a power amplifier 11, the output of which is passed through a filter 12 and coupled as shown at 13 to a transmitting antenna 14. In the specific embodiment of the invention described herein, the master transmitter preferably radiates a signal which comprises the sixth harmonic of a given fundamental. The eighth and ninth harmonics of this fundamental are radiated by two slave transmitters as will be described hereinafter. For the purposes of facilitating an understanding of the operation of the system, a fundamental frequency of 10 kc. has been chosen for use in the following specific description. In accordance with this assumption, frequencies of 80 kc. and 90 kc. are radiated by each of the slave stations, and a frequency of 60 kc. is radiated by the master station. Accordingly, the oscillator 10 is adjusted to produce a 60 kc. output, and the amplifier 11 is tuned to the same frequency. For reasons which will later become apparent, the filter 12 is tuned to reject 70 kc. signals.

Slave station B, which is illustrated in Fig. 2, is preferably situated fifty or more miles from the master transmitter and comprises a receiving antenna 15 coupled to a 60 kc. amplifier 16 serving to amplify 60 kc. signals received from the master transmitter. The output from the amplifier 16 is applied to a frequency divider 17 which produces from a 60 kc. input signal a 20 kc. output signal. The 20 kc. output from the frequency divider 17 is passed through an electronic phase regulator 18 and applied to a frequency multiplier 19 which produces from the 20 kc. input an output signal of 80 kc. The 80 kc. output from the multiplier 19 is amplified by a power amplifier 20 and applied to a transmitting antenna 21.

For the purpose of maintaining a fixed multiple phase relation between the 60 kc. master signals and the 80 kc. slave signals, a portion of the 60 kc. signal picked up by the receiving antenna 15 is amplified by a 60 kc. amplifier 22, multiplied to a frequency of 240 kc. by a frequency multiplier 23, and applied to one input of a phase discriminator 24. A small pickup loop 25 near the antenna 21 picks up an 80 kc. signal which is amplified by an 80 kc. amplifier 26, multiplied to a frequency of 240 kc. by a frequency multiplier 27, and applied to the other input of the phase discriminator 24. The phase discriminator 24 compares the two 240 kc. input signals and produces a control potential which varies in accordance with variations in phase of the two input signals. This control potential is applied as indicated at 28 to the electronic phase regulator 18 so as to produce a phase shift in the 20 kc. signal passed therethrough in such direction as to nullify the phase change which produced the change in the control potential.

For a more complete description of the slave transmitting apparatus and a more comprehensive explanation of the operation of the phase regulating equipment, reference should be had to the copending application filed by William J. O'Brien on August 27, 1945, for "Navigation system," Serial No. 612,987.

In Fig. 3 there is illustrated the apparatus comprising a second slave transmitter which has been designated "slave station C" and which is spaced from stations A and B fifty or more miles. This transmitter operates to radiate from a transmitting antenna 29 90 kc. signals derived from the 60 kc. master signals and bearing a fixed multiple phase relation thereto. The apparatus at this station is identical to that described in connection with Fig. 2, except for the frequencies to which the components are tuned. The 90 kc. signal is derived by dividing the 60 kc. master signal by two to provide a 30 kc. signal which is then trebled to provide the 90 kc. output. The phase discriminator operates at the least common multiple frequency of 180 kc.

As is explained in detail hereinafter, the master transmitter is arranged to radiate a 70 kc. signal which is used to control the operation of frequency dividing circuits in one form of mobile receiving apparatus. The 70 kc. signal is obtained by mixing a 60 kc. master signal with a 10 kc. signal derived from the 80 kc. and 90 kc. slave signals. The desired fixed multiple phase relations among all of the signals is obtained by controlling the phase of the 70 kc. signal in response to detected phase shifts of the above mentioned 10 kc. signal with respect to a 10 kc. beat note between the 60 kc. and 70 kc. master signals.

Accordingly, there is placed at the master transmitter location a receiving antenna 30 which feeds a pair of amplifiers 31 and 32 tuned respectively to 80 kc. and 90 kc. The amplified 80 kc. and 90 kc. signals received from slave stations B and C are applied to a mixing and rectifying circuit 33 which produces from these two input frequencies a 10 kc. output signal. A 60 kc. signal picked up from the master transmitting antenna 14 by a small pick-up loop 34 is amplified by a 60 kc. amplifier 35 and passed through a manual phase adjuster 36. The 60 kc. output from the phase adjuster 36 and the 10 kc. output from the mixer 33 are both applied to a mixer and detector 37 which produces from the two input signals a 70 kc. output. The 70 kc. output signal is passed through an electronic phase regulator 38 to a 70 kc. power amplifier 39. The power amplifier 39 is coupled to the antenna 14 through a filter 40 tuned to reject 60 kc. signals. Thus, the antenna 14 is caused to radiate simultaneously 60 kc. and 70 kc. signals. Since the 70 kc. signals are derived in part from the master 60 kc. signals, and in part from the 80 kc. and 90 kc. slave signals which are each in turn derived from the 60 kc. master signal, it is seen that the 70 kc. signals bear a true harmonic relation to the master signals and comprise the seventh harmonic of the given fundamental of which the 60 kc. master signal is the sixth harmonic.

For the purpose of regulating the phase of the 70 kc. signals, the electronic phase regulator 38 is arranged to be controlled by a control potential derived as indicated at 41 from a phase discriminator 42. One 10 kc. input to the phase discriminator is taken directly from the output of the mixer 33, and the other is derived as a beat note between the 60 kc. and 70 kc. signals radiated from antenna 14. The 70 kc. signals which are induced in the pickup loop 34 are amplified by a 70 kc. amplifier and, together with the 60 kc. output from the manual phase adjuster 36, are applied to a mixer and detector 44. The 10 kc. output from the mixer 44 is applied as shown at 45 to the second input to the phase discriminator 42. Changes in phase relation between the two 10 kc. inputs to the discriminator 42 results in a change in the control potential applied at 41 to the electronic phase regulator 38 so as to cause the regulator 38 to shift the phase of the radiated 70 kc. signal in such direction as to keep constant the phase relation between the two 10 kc. beat notes applied to the phase discriminator 42. Phase shifts introduced by manipulation of the phase adjuster 36 are employed to establish the desired phase relation between the 60 kc. and 70 kc. signals.

The intersecting hyperbolic equi-phase displacement field patterns resulting from the simultaneous operation of the transmitters A, B and C may be used to determine the position of a mobile vehicle through the use of a receiving apparatus such as is disclosed in a copending application filed by William J. O'Brien on August 27, 1945, for "Multiple channel radio frequency receiver," Serial No. 612,991. Described briefly, such a receiver comprises means for separately receiving the 60, 80, and 90 kc. signals; frequency multipliers for converting the 60 and 80 kc. signals to a common frequency of 240 kc.; frequency multipliers for converting the 60 and 90 kc. signals to a common frequency of 180 kc.; and phase indicators for measuring and indicating the phase relations between the two 240 kc. signals and between the two 180 kc. signals. It will be seen that the position defining field patterns are thus rather sensitive, being based respectively on 240 kc. and 180 kc.

There is illustrated in Fig. 4 a receiving apparatus for use with the transmitting system hereinbefore described which gives positional data in terms of field patterns based on 80 kc. and 90 kc. respectively. The receiver of Fig. 4 is accordingly better suited to use on fast moving vehicles such as aircraft because of the lower sensitivity of the indication. The receiver comprises four amplifiers 46, 47, 48 and 49 tuned respectively to 60, 70, 80, and 90 kc., all of the amplifiers being connected to a suitable receiving antenna 50. The output from the 80 kc. amplifier 48 and the output from the 60 kc. amplifier 46 are applied to a mixer and detector 51 which produces a 20 kc. beat note which is applied to one input of a phase discriminator 52. The 60 kc. output from the amplifier 46 is also applied to the input of a heterodyne divider 53 operating to derive a 20 kc. output signal from the 60 kc. input, the 20 kc. output signal being applied to the other input of the phase discriminator 52. The phase discriminator is coupled to a suitable indicator 54 for indicating the phase relation between the two 20 kc. signals.

In a similar way the 90 kc. output from the amplifier 49 is applied to the input of a mixer and detector 55 along with the 60 kc. output from the amplifier 46 so as to produce a 30 kc. beat note. The output from the 60 kc. amplifier 46 is also applied to a heterodyne divider 56 which operates to derive from the 60 kc. input a 30 kc. output. This 30 kc. output and the 30 kc. beat note above mentioned are applied to a phase discriminator 57 which operates to indicate on a suitable indicator 58 the phase relation between the two 30 kc. signals.

The heterodyne dividers 53 and 56 are illustrated in more detail in Figs 5 and 6 respectively, and Fig. 8 shows a suitable circuit. The divider shown in Fig. 5 for deriving a 20 kc. output from a 60 kc. input comprises a mixer 59 in which the 60 kc. signal from the master station is mixed with a 40 kc. signal obtained from a detector 60. The complex output from the mixer 59 is applied to a detector 61 which is adjusted to develop in its output circuit a 20 kc. signal represented by the envelope of the rectified complex wave. This 20 kc. signal is applied to the discriminator 52 and is also applied to the input of a mixer 62 along with a 60 kc. signal from the master station. The resulting complex wave is rectified and filtered by the detector 60 to produce the 40 kc. signal which is applied to the mixer 59.

The divider shown in Fig. 6 for deriving a 30 kc. signal from the 60 kc. master signal is similar to that shown in Fig. 5 and differs therefrom in the frequencies to which the various components are tuned, and in using as the second input to the first mixer the sum of the output and master frequencies instead of the difference as described in connection with Fig. 5.

Reference to Figs. 4, 5 and 6 will show that the output from the 70 kc. amplifier 47 is applied to the heterodyne dividers 53 and 56, the specific point of application being the detector 61 of Fig. 5 and the corresponding detector of Fig. 6. This 70 kc. signal is used to synchronize the operation of the dividers to prevent the introduction of an unwanted ambiguity. Since the divider 53 operates to divide the master signal frequency by three, it follows that there is a possible three to one ambiguity between the 60 kc. input and the 20 kc. output. That this is so may be seen by noting that for a given multiple phase relation between the 40 kc. and 60 kc. signals, there are three different arrangements of the two signals in which the given multiple phase relation obtains and that these three arrangements are spaced 120 electrical degrees with respect to the 20 kc. output frequency. The substantial coincidence in time of the 60 kc. and 70 kc. signals is used to control the operation of the divider circuit. Since this coincidence occurs only once every six cycles of the 60 kc. signal, it is seen that the divider is synchronized in every other possible correct relationship. In the case of the divider 56, synchronization is obtained in every third possible correct relationship.

In Fig. 8 there is shown a circuit which is suitable for the heterodyne divider illustrated by way of a block diagram in Fig. 5. The divider comprises input terminals 63, 64, and 65, the terminal 65 being common, and the terminals 63 and 64 being connected to the outputs of the 60 and 70 kc. amplifiers respectively. The terminal 63 is connected through a blocking condenser 66 to the primary winding 67 of a transformer 68. A secondary winding 69 of this transformer has one end connected to the control grid of a triple grid vacuum tube 70. The plate of the tube 70 is connected through a primary winding 71 of a transformer 72 to a suitable supply of direct plate potential represented in Fig. 8 by the legend "HT." The winding 71 is tuned to the desired output frequency—in the assumed case, 20 kc. The plate of the tube 70 is also connected through a blocking condenser 73 to one output terminal 74, a second output terminal 75 being grounded.

Between the source of plate supply potential HT and ground there is connected a voltage divider comprising resistances 76, 77, and 78. The cathode and suppressor grid of the tube 70 are connected together and to the common point between resistances 77 and 78, this point being by-passed to ground by a condenser 79. The screen grid of the tube 70 is connected through a resistance 80 to the common point between resistances 76 and 77 and also through a blocking condenser 81 to the 70 kc. input terminal 64. The common point between resistances 76 and 77 is bypassed to ground by a condenser 82.

A secondary winding 83 of the transformer 72 has one terminal connected to the control grid of a triple grid vacuum tube 84, the output circuit for this tube comprising a primary winding 85 of a transformer 86 which is tuned to 40 kc. The cathode, suppressor grid, and screen grid circuits for the tube 84 are similar to those for tube 70 and differ therefrom only in connecting the screen grid directly to the voltage divider and in omitting the connection of the screen grid to the 70 kc. input terminal.

A connection 87 extends between the lower end of the winding 83 and the condenser 66 so that the signal applied to the grid of the tube 84 is the complex signal resulting from the mixing of the 60 kc. master signal with the 20 kc. output signal developed across the tuned winding 71. A secondary winding 88 of the transformer 86 has one end grounded and the other end connected as by a conductor 89 to the lower end of the winding 69. This applies to the grid of the tube 70 a complex wave resulting from the mixing of the 60 kc. master signal and the 40 kc. signal developed across the tuned winding 85.

The resistances 76, 77, and 78, and the corresponding resistances for the tube 84 are adjusted to apply the proper operating potential to the screen grids, and to bias the tubes substantially to cutoff so that they are operative only during the positive half cycles of the input grid signals. The tubes thus serve to rectify the input signals. The magnitude of the 70 kc. signal which is applied to the screen grid of the tube 70 is preferably adjusted to substantially prevent operation of the tube except during the positive half cycles of the 70 kc. signal.

In operation, 60 kc. and 40 kc. signals are mixed in the winding 69. The resulting signal is rectified by the tube 70 and the output is applied to the tuned winding 71 to develop thereacross a 20 kc. signal which is applied to the output terminals. The 20 kc. signal is also mixed with a 60 kc. signal in the winding 83 and the resulting complex wave is rectified by the tube 84 to develop across the tuned winding 85 the 40 kc. signal which is mixed with the 60 kc. signal in the winding 69.

The effect of the 70 kc. signal is preventing operation of the tube 70 during the negative cycles of the 70 kc. signal produces from the 40 and 60 kc. signals a 20 kc. signal, every other positive maxima of which coincides with the positive maxima of the 10 kc. envelope resulting from a mixing of the 60 and 70 kc. signals. Mixing this 20 kc. signal with the 60 kc. signal and rectifying the resultant in the detector 84 produces a 40 kc. signal, every other positive maxima of which coincides with the positive maxima of the 20 kc. signal. This is the phasing of the 40 kc. signal relative to the 60 kc. signal which is optimum for producing a 20 kc. signal which is so phased as to cause every other positive maxima thereof to coincide with the positive maxima of the 10 kc. envelope representing a mixture of the 60 kc. and 70 kc. signals. Thus the injection of the 70 kc. signal into the detector 70 insures that the 20 kc. output will always occupy a single one of its three possible multiple phase relations to the 60 kc. master signal.

The above explanation may be more readily understood by having reference to Fig. 7 in which graph A shows the relation between the 60 kc. signal 90, the 40 kc. signal 91, and the 20 kc. signal 92 which results from rectification of the envelope 93 of the 60/40 kc. complex wave. Graph B shows the 10 kc. envelope 94 corresponding to a mixture of a 60 kc. signal 95 and a 70 kc. signal 96. Note that the positive maxima of the 10 kc. envelope 94 coincide with every other positive maxima of the 20 kc. signal 92. In graph C the 20 kc. signal of graph A is reproduced at 97 and the 60 kc. signal of graph A is reproduced at 98. The 40 kc. signal 99 results from the rectification of the envelope 100 of the resulting complex wave. It is this 40 kc. signal which is reproduced in graph A at 91. Note that in graph C every other positive maxima of the 40 kc. signal 99 coincides with the positive maxima of the 20 kc. signal 97, and that in graph A it is this phasing of the 40 kc. signal which causes the 20 kc. signal 92 to have every other positive maxima coincident with the positive maxima of the 10 kc. envelope 94 of graph B.

In addition to preventing the introduction of an ambiguity as a result of the frequency division in the receiver, the transmission of a 70 kc. signal from the master station secures a further advantage. Reference to Figs. 2 and 3 will show that the 80 kc. and 90 kc. slave signals are each derived by a process which includes the step of dividing the received 60 kc. master signals. Thus, each time the transmitters are placed in operation, the frequency dividers might start their operation with a different one of the plurality of possible multiple phase relationships existing between the 60 kc. master signal and the derived submultiple thereof. This ambiguity causes no difficulty with a receiver of the character described in the aforementioned copending application Serial No. 612,991 because such a receiver includes means for multiplying the slave frequencies by a factor which is numerically equal to the ambiguity which may be introduced by the divider at the slave station, thus eliminating the ambiguity. In a receiver such as has been described in detail herein, it is necessary that the submultiple frequency which results at the receiver from the division of the master signal frequency bear the proper phase relation to the beat note between the master signal and the slave signal. The described system for deriving and using the 70 kc. master synchronizing signal insures the maintenance of this required relation.

The way in which the above mentioned result is obtained is best seen by considering a numerical example. Using as a standard the assumption that the system is operating, that the proper phase relations obtain, and that all phase shifts will be referred to the 60 kc. master signal as a phase standard, let us assume that the slave transmitter B momentarily goes off the air and that upon resumption of operation the 80 kc. signal is advanced 120° from its previous phasing, this advance resulting from the ambiguity present in the slave transmitter frequency divider. The 120° advance in the 80 kc. slave signal produces a like advance in the output from the amplifier 31. Assuming the 90 kc. signal phase to be unchanged, this results in a 120° retardation in the phase of the 10 kc. output from the mixer 33. The retardation of the 10 kc. beat note produces a like retardation in the output from the mixer 37 so that the radiated 70 kc. signal has its phase retarded 120° from the prior relationship. This retardation is also seen in the output from amplifier 43 and causes a similar retardation in the 10 kc. beat note output from the mixer 44. Note that the two inputs to the phase discriminator 42 (the 10 kc. beat notes from mixers 33 and 44) have both been subjected to a phase retardation of 120° so that the phase regulating system now operates to maintain this new phasing of the 70 kc. signal.

Considering now the receiver of Figs. 5 and 7, it is seen that the 120° advance of the transmitted slave signal will produce a like advance in the output from the amplifier 48. This causes a 120° advance in the output signal from the mixer 51 so that the 20 kc. signal applied to the lower input of the phase discriminator 52 is advanced 120° in phase. However, the 120° retardation of the phase of the 70 kc. synchronizing signal produces a like shift in the output from the amplifier 47. As will be seen from graph B of Fig. 7, this retardation of the 70 kc. signal similarly shifts the 10 kc. envelope 94. For the 40 kc. signal 91 and the 20 kc. output signal 92 of graph A to coincide with this new position of the 10 kc. envelope 94, the 40 kc. must retard 120°. Assuming that this shift takes place, it is seen that the 20 kc. signal is thereby advanced 120°. The validity of the assumption of a 120° retardation of the 40 kc. signal may be seen by reference to graph C wherein it is seen that a 120° advance of the 20 kc. signal 97 produces a 120° retardation of the 40 kc. signal 99.

This it is seen that the 120° retardation of the 70 kc. synchronizing signal advances by a like amount the 20 kc. signal applied to the upper input of the phase discriminator 52. It has been shown that the accompanying 120° advance in phase of the received 80 kc. slave signal results in an equal advance in the 20 kc. signal applied to the lower input of the phase discriminator 52. These two shifts are compensating, so that the indication given by the indicator 54 is unchanged.

A similar analysis with regard to the 90 kc. slave signals will show that shifts in the phase of these signals is compensated in the same way.

It has been stated that although the phase measurements at the receiver are made at frequencies of 20 kc. and 30 kc., the actual pattern is based on 80 kc. and 90 kc. This is also best seen by considering a numerical example in connection with Figs. 4 and 5. Using the 60 kc. signal as a reference, let us assume that the position of the receiver is changed at a constant radius from the master station so that the 80 kc. signal is advanced at the receiver by 8°. From Fig. 4 it is seen that this advance of 8° in the received 80 kc. signal will produce an 8° advance in the 20 kc. signal to the lower input of the phase discriminator 52, while the upper input remains unchanged due to being derived from an unchanged 60 kc. master signal. The indicated phase change is thus equal to the phase change at the slave frequency, and it therefore follows that the pattern is based on the slave frequency and not on the sub-multiple used for the phase measurement. A similar analysis with regard to the 90 kc. signals will show that the other pattern is also based on the slave frequency.

From the foregoing, it will be observed that there has been provided a new Navigation System of the continuous phase measurement type, and that the system described operates to generate simultaneously and with a single set of transmissions a sensitive field pattern suitable for the accurate navigation of slow moving vehicles, and a coarser pattern better suited to the navigation of more rapidly moving vehicles such as aircraft. Attention is directed particularly to the 70 kc. signal and its derivation to thereby permit the use of a receiver employing frequency divider circuits without introducing an ambiguity. It should also be noted that the 70 kc. signal serves to automatically compensate the receiver for the ambiguities inherent in the slave frequencies when those frequencies are derived from the master signal by a process which includes one or more frequency divisions.

While there has been shown and described the preferred embodiment of this invention, the same is not to be limited to the details described, except as defined in the appended claims.

I claim:

1. In a radio frequency navigation system including means for radiating from three spaced points three signals of unlike but harmonically related frequencies bearing fixed multiple phase relations to each other, the combination of: means for radiating from one of said points a fourth signal of a frequency such that the difference between the frequencies of the two signals radiated from said one point is equal to the difference between the frequencies of the other two signals; and means responsive to variations in the phase relation between said two differences for regulating the phase of said fourth signal.

2. In a radio frequency navigation system including means for radiating from three spaced points three signals of unlike but harmonically related frequencies bearing fixed multiple phase relations to each other, the combination of: means at one of said points for receiving and mixing the signals radiated from the other two of said points to produce a first beat note of given frequency; means for mixing said first beat note with the signal radiated from said one point to produce a fourth signal having a frequency equal to the sum of the frequencies of said first beat note and said signal radiated from said one point; means for radiating said fourth signal from said one point; means at said one point for picking up and mixing the signals radiated from said one point to produce a second beat note of said given frequency; a phase discriminator for comparing said first and second beat notes and producing a control potential which varies in accordance with variations in the phase relation between said two beat notes; and phase regulating means responsive to variations of said control potential for shifting the phase of said fourth signal.

3. In a radio frequency navigation system including means for radiating from spaced points two signals of different but harmonically related frequencies bearing a fixed multiple phase relation to each other, a receiving apparatus comprising: means for separately receiving said signals, means for mixing said received signals to produce a beat note of a given frequency, means for deriving from one of said received signals another signal having said given frequency, and means for measuring and indicating the phase relation between said beat note and said other signal.

4. In a radio frequency navigation system including means for radiating from spaced points two signals of different but harmonically related frequencies bearing a fixed multiple phase relation to each other, a receiving apparatus comprising: means for separately receiving said signals, means for mixing said received signals to produce a beat note of a given frequency, a first and a second mixer, means for applying to the input of said first mixer one of said signals and the output from said second mixer, means for applying to the input of said second mixer said one signal and the output from said first mixer, said first mixer having an output circuit tuned to produce an output signal of said given frequency, and means for measuring and indicating the phase relation between said beat note and said output signal.

5. In a radio frequency navigation system including means for radiating from a first and a second point spaced from each other a first and a second signal respectively of different but harmonically related frequencies and including means for radiating from said first point a synchronizing signal of a frequency harmonically related to the frequency of said first signal in such wise that the difference in frequency between said synchronizing signal and said first signal is not greater than the difference in frequency between said first and second signals, and all of said signals bearing fixed multiple phase relations to each other, a receiving apparatus comprising: means for separately receiving said signals; means for mixing said received first and second signals to produce a beat note of given frequency; a first and a second mixer-detector; means for applying to the input of said first mixer-detector said first signal and the output from said second mixer-detector; means for applying to the input of said second mixer-detector said first signal and the output from said first mixer-detector, said first mixer-detector having an output circuit tuned to produce an output signal of said given frequency; means for applying said received synchronizing signal to said first mixer-detector for blocking the operation thereof during the negative half cycles of said synchronizing signal; and means for measuring and indicating the phase relation between said beat note and said output signal.

6. In a radio frequency navigation system, the combination of: transmitting means comprising means for radiating from a first, second, and third point mutually spaced from each other a first, second and third signal respectively of unlike but harmonically related frequencies bearing fixed multiple phase relations to each other, means at said first point for receiving and mixing said second and third signals to produce a first beat note of given frequency, means for mixing said first beat note with said first signal to produce a synchronizing signal having a frequency equal to the sum of the frequencies of said first beat note and said first signal, means for radiating said synchronizing signal from said first point, means at said first point for picking up and mixing said first signal and said synchronizing signal to produce a second beat note of said given frequency, a phase discriminator for comparing said first and second beat notes and producing a control potential which varies in accordanc with variations in the phase relation between said two beat notes, and phase regulating means responsive to variations of said control potential for shifting the phase of said synchronizing signal; and a receiving apparatus comprising means for separately receiving said signals, means for mixing said received first and second signals to produce a first output signal, a first and a second mixer-detector, means for applying to the input of said first mixer-detector said received first signal and the output from said second mixer-detector, means for applying to the input of said second mixer-detector said received first signal and the output from said first mixer-detector, said first mixer-detector having an output circuit tuned to produce a second output signal having a frequency equal to the frequency of said first output signal, means for applying said received synchronizing signal to said first mixer-detector for blocking the operation thereof during the negative half cycles said received synchronizing signal, and means for measuring and indicating the phase relation between said first and second output signals.

7. In a radio frequency navigation system including means for radiating a master signal, a first slave signal, a second slave signal and a synchronizing signal, all of such signals having different frequencies and all being harmonics of a given frequency, the combination of: means at a first location including a fixed frequency oscillator for producing and radiating said master signal; frequency conversion means at a location spaced from said first location including a receiver for receiving said master signal for producing and radiating said first slave signal; frequency conversion means at a location spaced from said first location for producing from a received master signal and radiating said second slave signal, at least one of said frequency conversion means including a frequency divider; a mobile receiver adapted to receive the radiated signals and to provide a line of position indication; and means at said first location for producing and radiating said synchronizing signal, said last-mentioned means including means for receiving both of said slave signals and means for deriving said synchronizing signal from said master signal and said received slave signals in such a manner as to provide a change in the phase of the synchronizing signal with each change in phase of a slave signal, changes in synchronizing signal phase due to slave signal phase changes corresponding to alternate phase relations in the synchronizing of said frequency divider being such as to produce no change in said line of position indicated by said mobile receiver.

8. In a radio frequency navigation system having a master control unit producing a signal of a given frequency and a synchronizing signal of a second frequency, two slave control units for producing a first slave signal of a third frequency and a second slave signal of a fourth frequency, all four signals being of different frequencies and each being a different harmonic of a fundamental frequency, said given frequency and said second frequency having a difference frequency equal to said fundamental frequency, and said third and said fourth frequencies having a difference frequency equal to said fundamental frequency, the combination of: a frequency divider circuit controlled by said signal at given frequency in at least one of said slave control units, ambiguous phasing combinations of said first and second slave signals thereby being equal in number to the harmonic number of said given frequency; means in said master control unit responsive to variations in the phase of the said first and second slave signals for regulating the phase of said synchronizing signals to produce a fixed phase relation between a beat note signal from said given frequency and said synchronizing signal and a beat note signal from said slave signals irrespective of said ambiguous phasing combinations due to alternate phase relations in the synchronizing of said divider.

9. In a radio frequency navigation system, the combination of: an oscillator for producing a signal of a given frequency; a first power amplifier coupled to said oscillator; an antenna coupled to said power amplifier for radiating a first signal of a given frequency; means for receiving from a distant location a signal of a second frequency different from said given frequency but harmonically related thereto; frequency conversion means coupled to said receiving means for producing a signal of a third frequency harmonically related to said given frequency; a second power amplifier coupled to said frequency conversion means; means coupling said second power amplifier to said antenna; means for resonating said antenna to both said given frequency and said third frequency; filter means between said first power amplifier and the said antenna tuned to reject said third frequency; and filter means between said second power amplifier and said antenna tuned to reject said given frequency, said filter means serving to isolate the crossfeed between said first and second amplifiers to a degree sufficient to so reduce the modulation product of said second frequency as to reduce to a negligible amount interference with said signal received from said distant location.

WILLIAM JOSEPH O'BRIEN.

No references cited.